Figure 2:
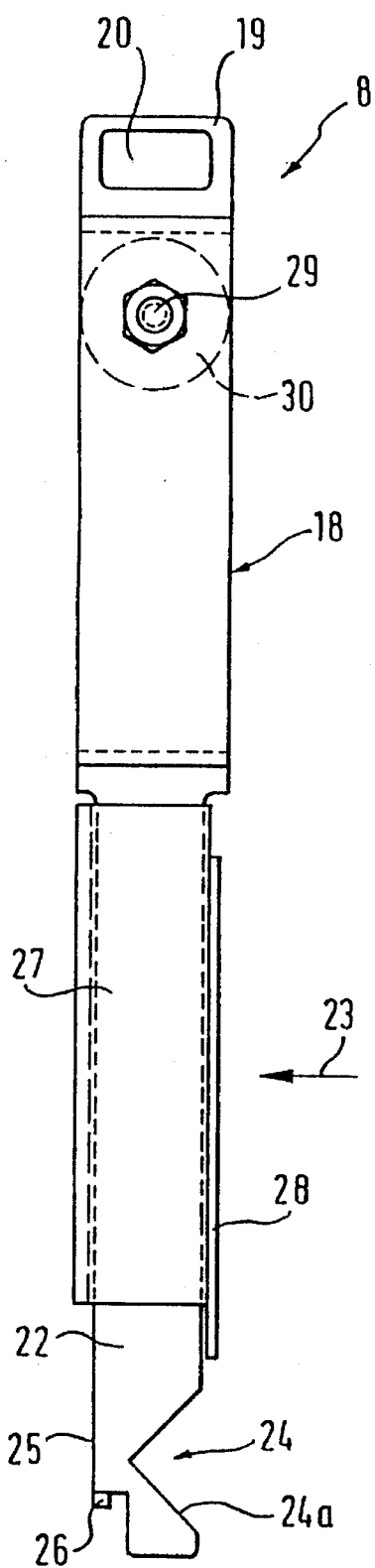

United States Patent [19]
Ouwejan

[11] Patent Number: 5,573,101
[45] Date of Patent: Nov. 12, 1996

[54] METHOD AND EQUIPMENT FOR SORTING GOODS HANGING ON HANGERS

[75] Inventor: Josephus J. Ouwejan, Veenedaal, Netherlands

[73] Assignee: Franz Gaertner, Unterelsbach, Germany

[21] Appl. No.: 193,169

[22] PCT Filed: Aug. 11, 1992

[86] PCT No.: PCT/EP92/01825

§ 371 Date: Jun. 13, 1994

§ 102(e) Date: Jun. 13, 1994

[87] PCT Pub. No.: WO93/03985

PCT Pub. Date: Mar. 4, 1993

[30] Foreign Application Priority Data

Aug. 12, 1991 [DE] Germany .......................... 41 26 615.3

[51] Int. Cl.⁶ .................................................. B65G 37/00
[52] U.S. Cl. ........................ 198/349; 198/358; 198/465.4
[58] Field of Search ................................. 198/349, 349.5, 198/349.6, 358, 359, 362, 465.4, 678.1, 680

[56] References Cited

U.S. PATENT DOCUMENTS

| | | | |
|---|---|---|---|
| 4,736,687 | 4/1988 | Grube et al. | 198/349 X |
| 4,907,699 | 3/1990 | Butcher et al. | 198/465.4 X |
| 4,909,373 | 3/1990 | Geerts | 198/465.4 X |
| 5,072,822 | 12/1991 | Smith | 198/349 |
| 5,125,498 | 6/1992 | Meyn | 198/465.4 |
| 5,141,094 | 8/1992 | Speckhart et al. | 198/678.1 X |

FOREIGN PATENT DOCUMENTS

| | | | |
|---|---|---|---|
| 0005539 | 11/1979 | European Pat. Off. . | |
| 0376382 | 7/1990 | European Pat. Off. . | |
| 1191297 | 4/1965 | Germany | 198/678.1 |
| 2423523 | 12/1974 | Germany | 198/358 |
| 0308692 | 2/1969 | Sweden | 198/349 |

*Primary Examiner*—James R. Bidwell
*Attorney, Agent, or Firm*—Goodman & Teitelbaum, Esqs.

[57] ABSTRACT

The invention refers to a method as well as the equipment for the automatic sorting of goods transported in file hanging on hangers and provided with codes, in particular garments hanging on coat hangers, in a sorting equipment with an overhead conveyor system, whereby a determined hanger belonging to a hanger file is discharged in a programmed fashion, based on the coding, from one of several delivery stations located in a delivery stretch, and whereby before being transported to the delivery stretch the hanger is placed on an intermediate hanger which is equipped with a roll in order to be rolled off, hanging on a guide rail of the conveyor system of the sorting equipment.

33 Claims, 9 Drawing Sheets

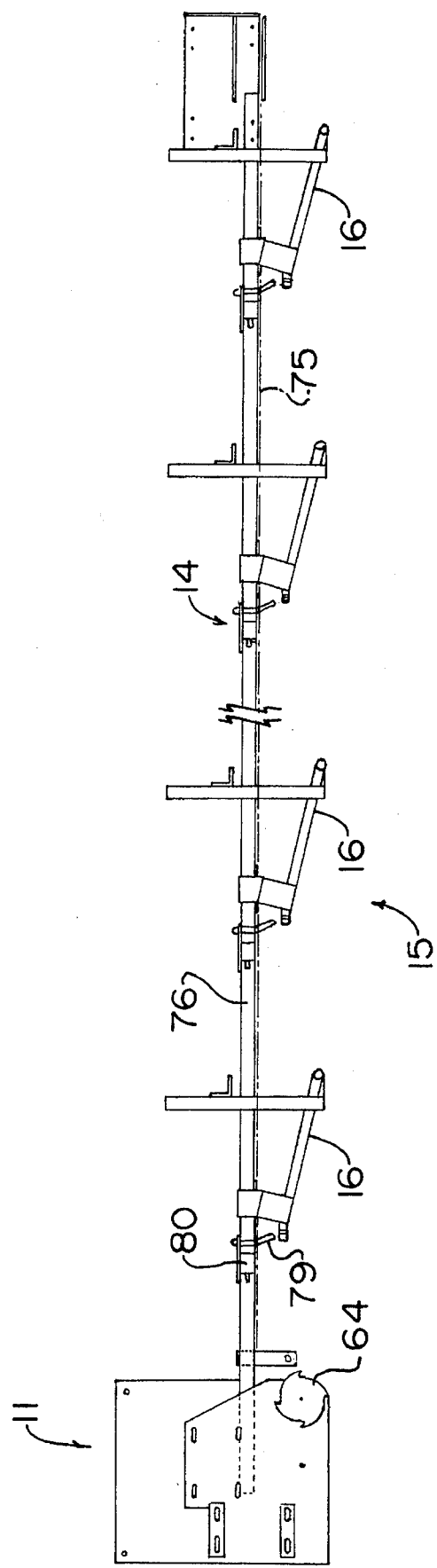

METHOD AND EQUIPMENT FOR SORTING GOODS HANGING ON HANGERS

The invention refers to a method and the equipment for the sorting of goods hanging on hooks or hangers or similar article carrying devices, in particular garments hanging on coat hangers.

In the garment industry, garments of different type, shape, size, colour or similar, for instance those belonging to an order, are usually collected. This occurs for instance immediately after the garments are sewn and ironed, or for example they are picked up at a collection warehouse in which garments of the same type are grouped and stored in an orderly fashion. For instance, a client orders 10 blue jackets, 10 black jackets, 3 grey slacks, 4 slacks with a different cut in one order. In order to manage this sorting and distribution work, sorting devices, so called sorters, are known which are equipped with electronic detecting equipment and electronically controlled switching systems.

These sorting devices are able to register the garments hanging one behind the other on coat hangers during transportation and can transport the coat hangers on guide rail systems equipped with electronically controlled delivery installations located on specific points along the conveying route. Thanks to a pre-programmed connection based on the registration, a specific lock is opened when a specific electronically detected garment is in the lock area. The coat hanger with the specific garment leaves the row of coat hangers through the lock, and for instance, gets to a collecting guide rail on which a collection order is being gathered in order to be transported.

Laundries and dry cleaners for instance carry out a similar type of work.

In most cases the coat hangers with the garments are carried in one sorter to a registration station by means of a screw conveyor, where they are detected electronically. From the registration station they are transferred to a guide rail system in which the lock installations are located, by means of a transfer system.

Inserted after the lock installation area are take-over systems and collecting guide rails serving, for instance, as intermediate storage devices. On the guide rail system the hooks of the coat hangers are moved for instance with engaging fingers attached to chain belts, i.e. they glide or slide along the guide rails. A sorter of this type, for instance, is described in the patent EP-A2 0 064 100. The disadvantage of these known sorters is that they have a complicated construction, but above all that they operate too slowly with regards to the transportation on the guide rail system as well as with regards to the lock system. Another disadvantage is that the means for registration and identification are placed on the garments. The same are particularly difficult to recognize and detect when the garments move unchecked during transportation, are not hanging straight or swing. This causes incorrect sorting which requires a considerable effort to avoid or remedy. For this reason, the registration is often still carried out manually, i.e. by operating personnel.

The purpose of the invention is to create a method and an equipment which allows the fully automatic, expedient, very fast and safe sorting using simple means.

An important basic principle of the invention is based on assigning each article to be sorted and transported an intermediate hanger which can be easily equipped with a guide coding for the article or article group which is readily detected and which is automatically incorporated directly next to the inlet side of the sorter, between the hook of a coat hanger and the guide rail of the rail systems, and which can be automatically removed from the hook after leaving the sorter. The intermediate hanger is provided with a roll which rolls on the guide rails of the rail system and has a hook catcher which can be closed, and which for instance receives the hook of the coat hanger, storing it during transportation and which can be automatically opened in order to receive or deliver a coat hanger. Between the hook catcher and the roll is the actual hanger body which has means for the recognizable attachment of codes, e.g. sufficiently large surfaces. This allows for instance the automatic intermediate hanging of the intermediate hanger between the guide rail and the article carrier simultaneously with the coding of the hanger or the detection of a code already placed on the hanger which is then saved in a suitable data processing system which in turn controls the passage through and the discharge from the sorter. Sorted and discharged goods are separated from the intermediate hanger by automatic means and usually distributed with the article carriers, for instance the coat hangers.

Figure 1:
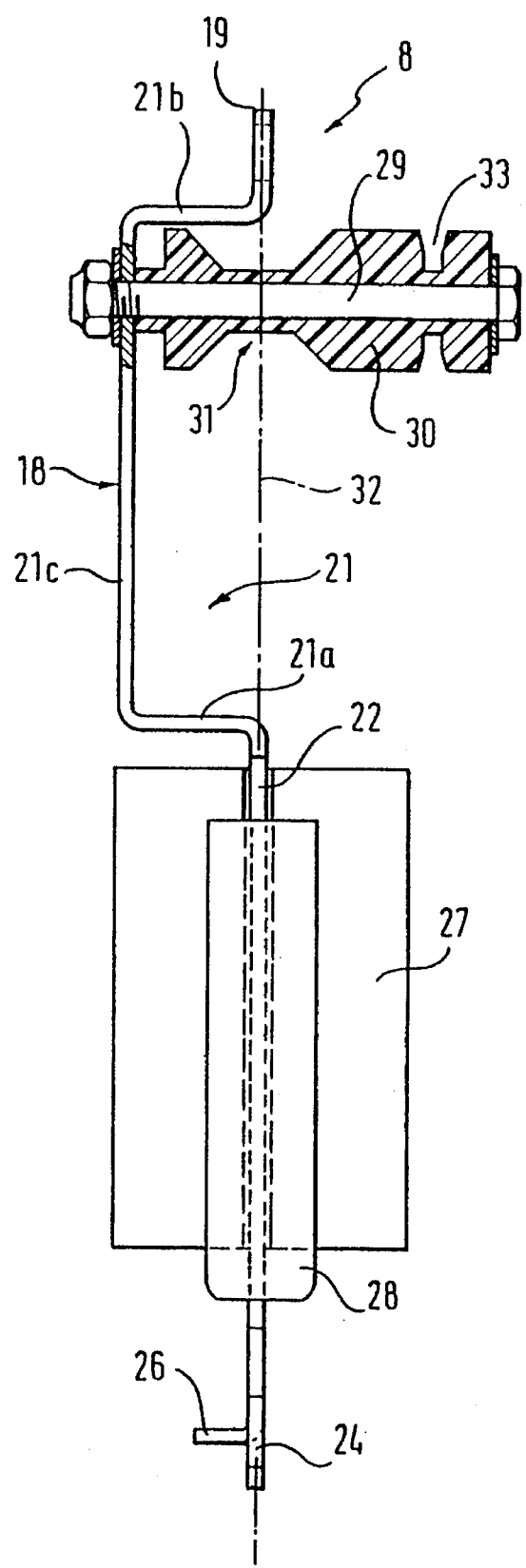
Figure 3:
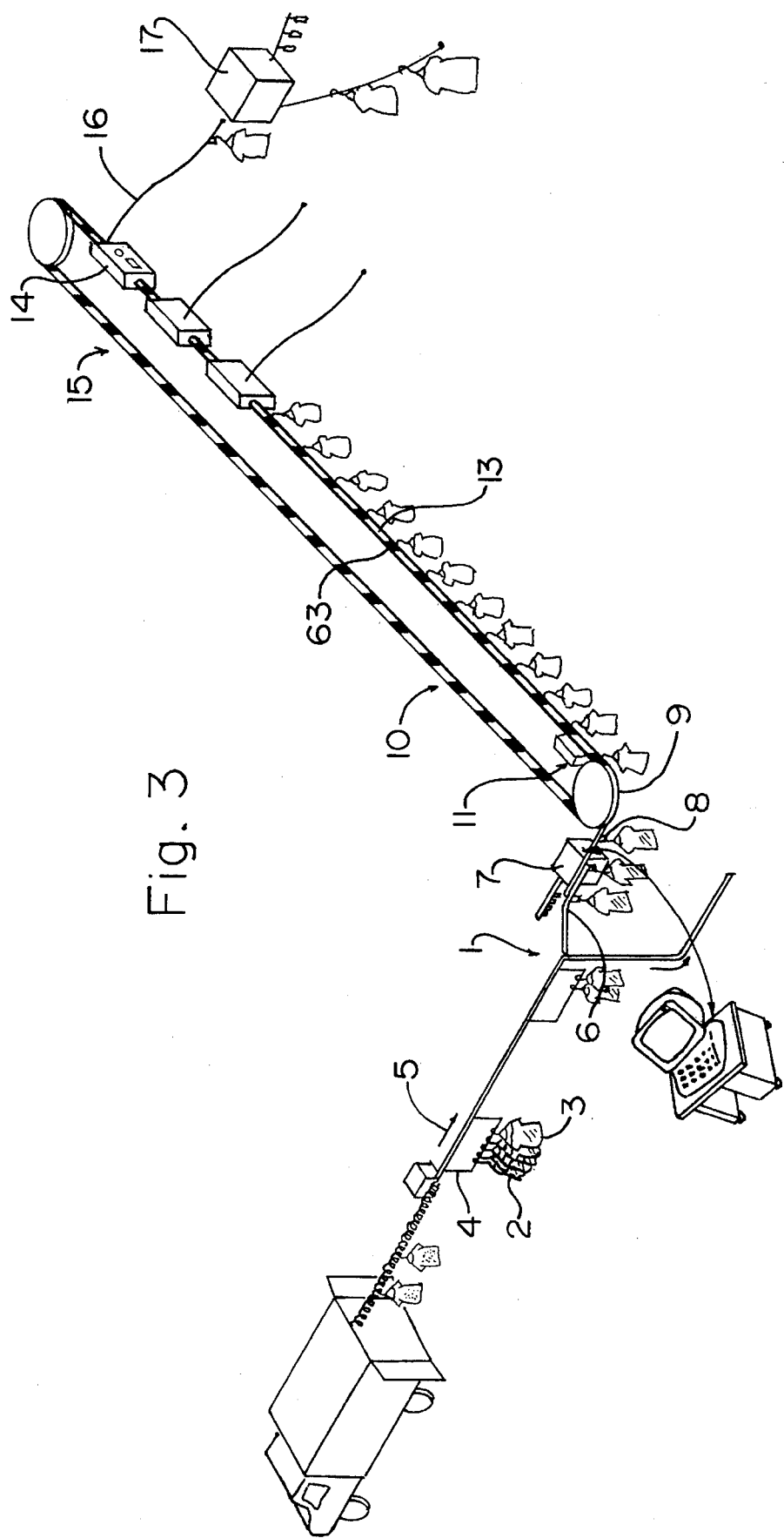
Figure 4:
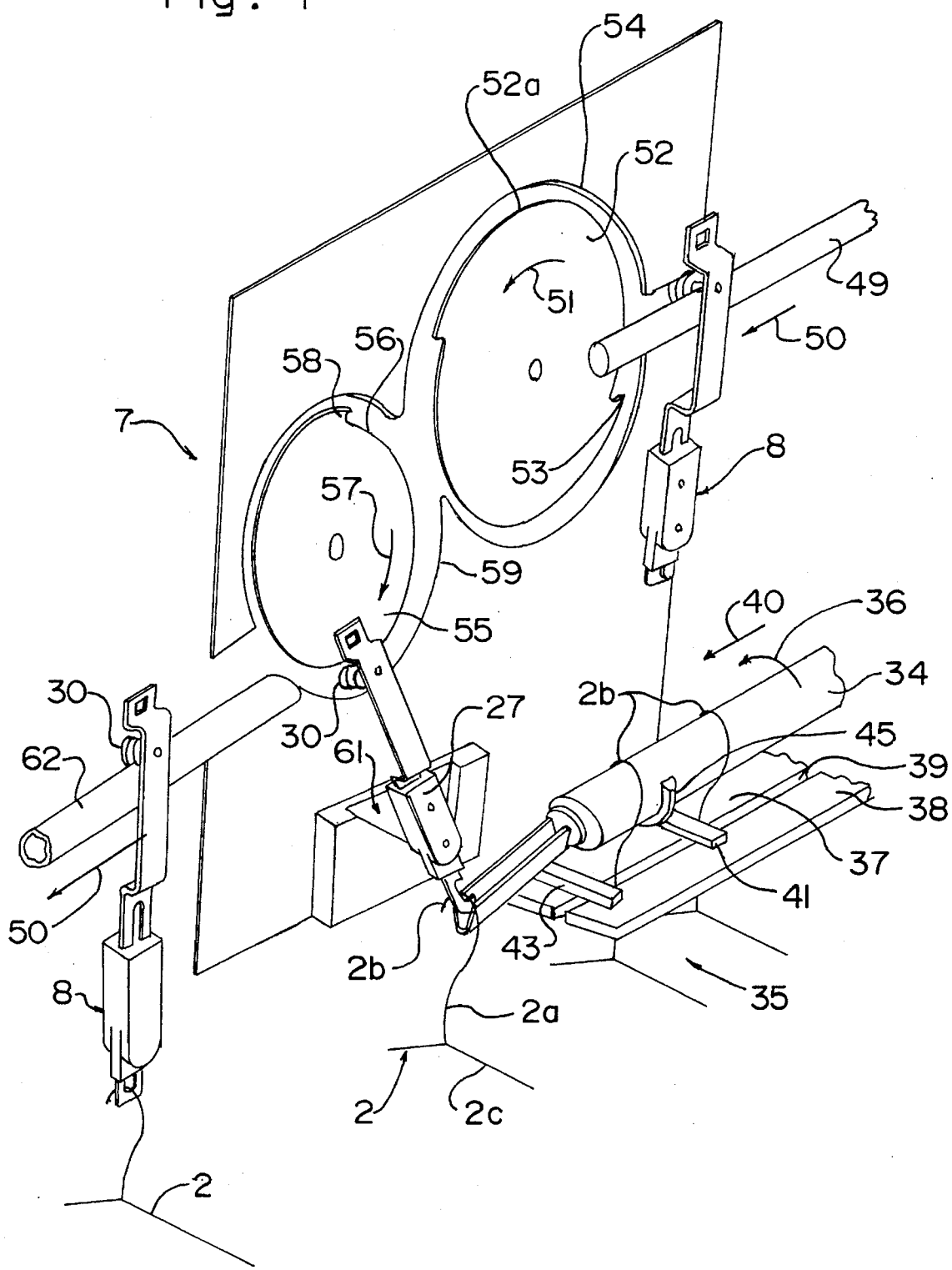
Figure 5:
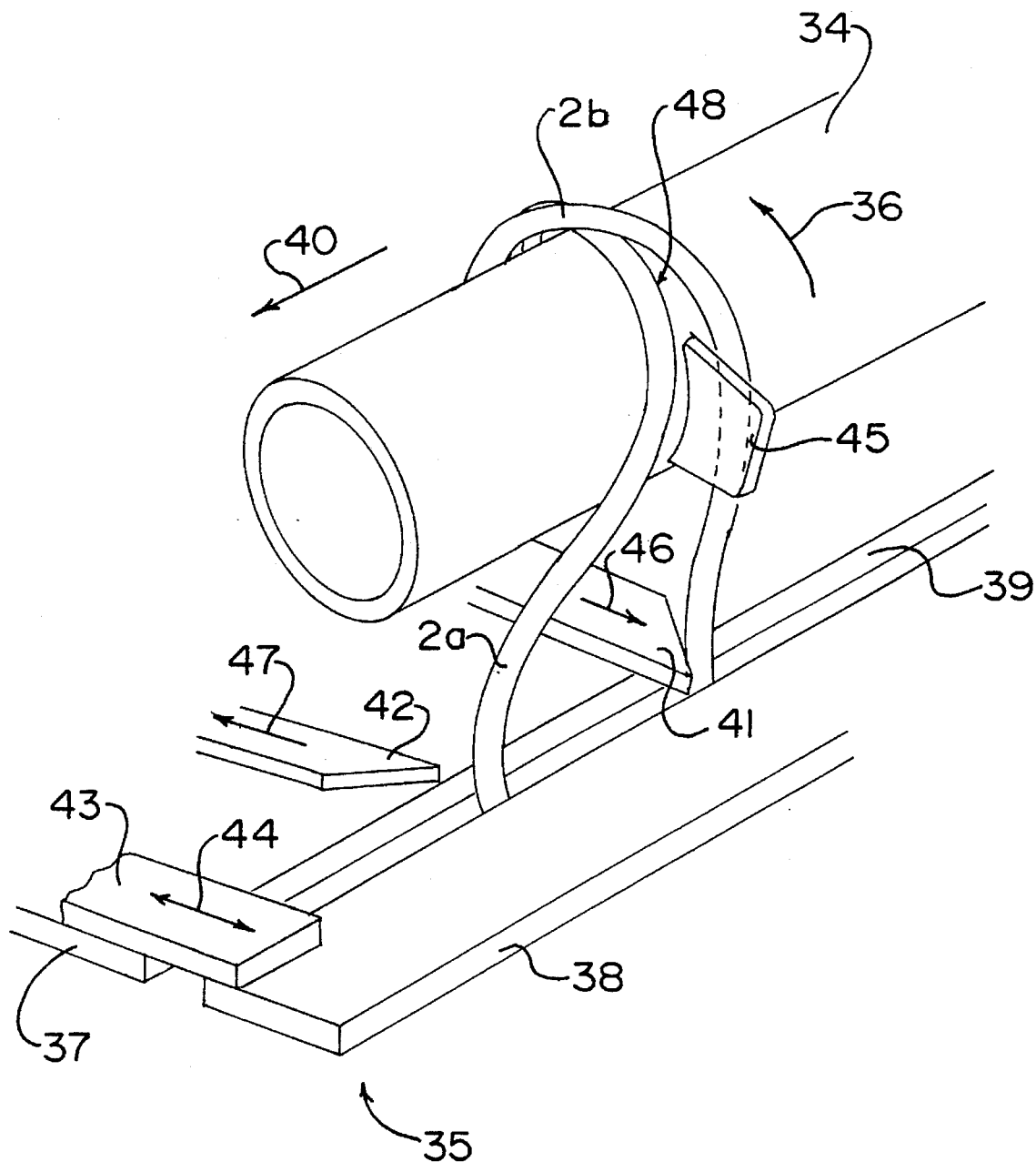
Figure 7:
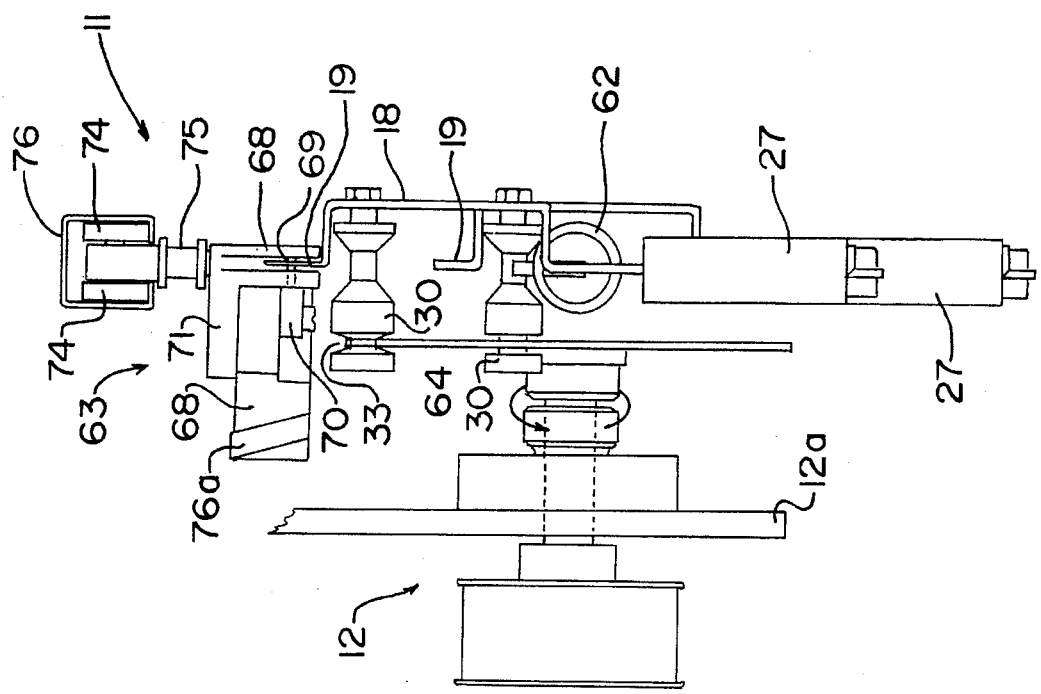
Figure 6:
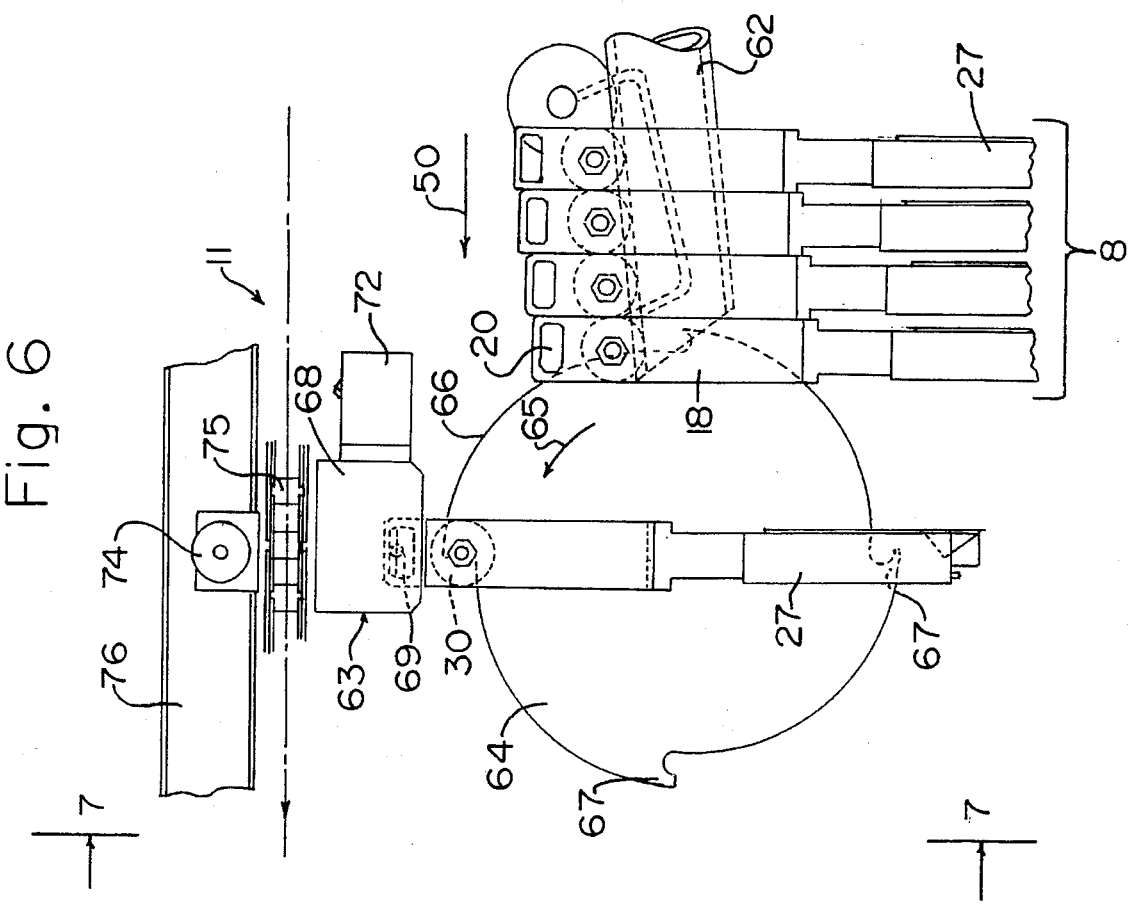
Figure 9:
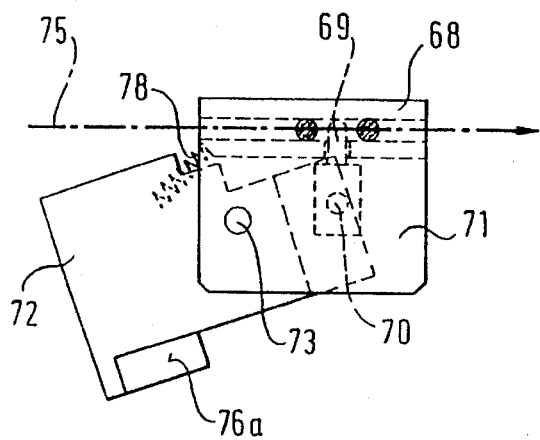
Figure 10:
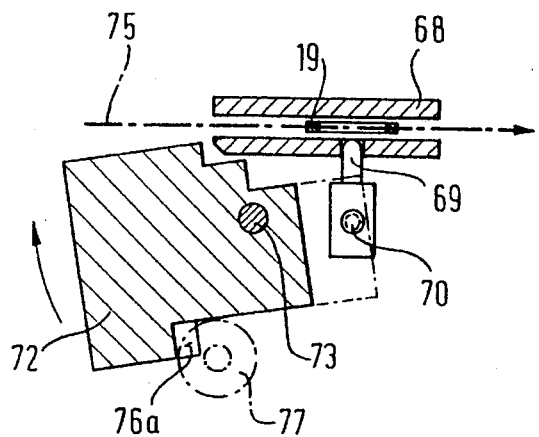
Figure 8:
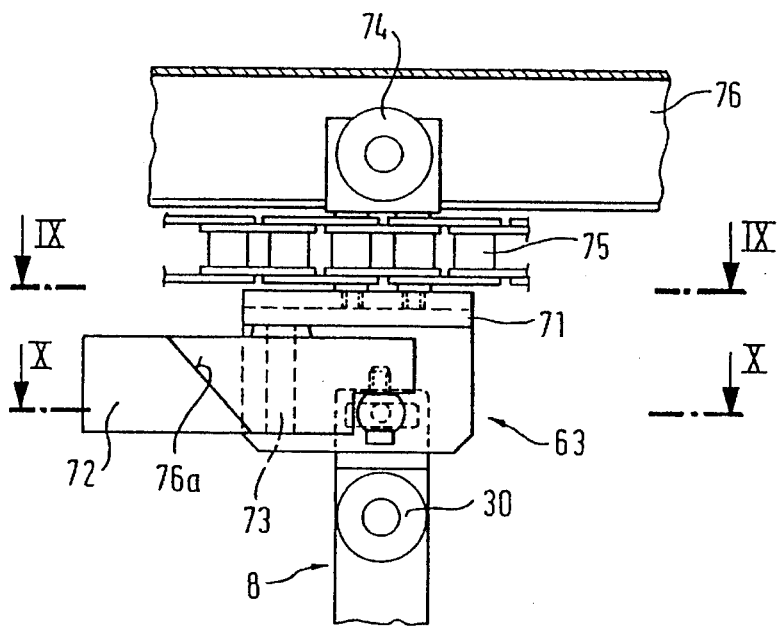
Figure 12:
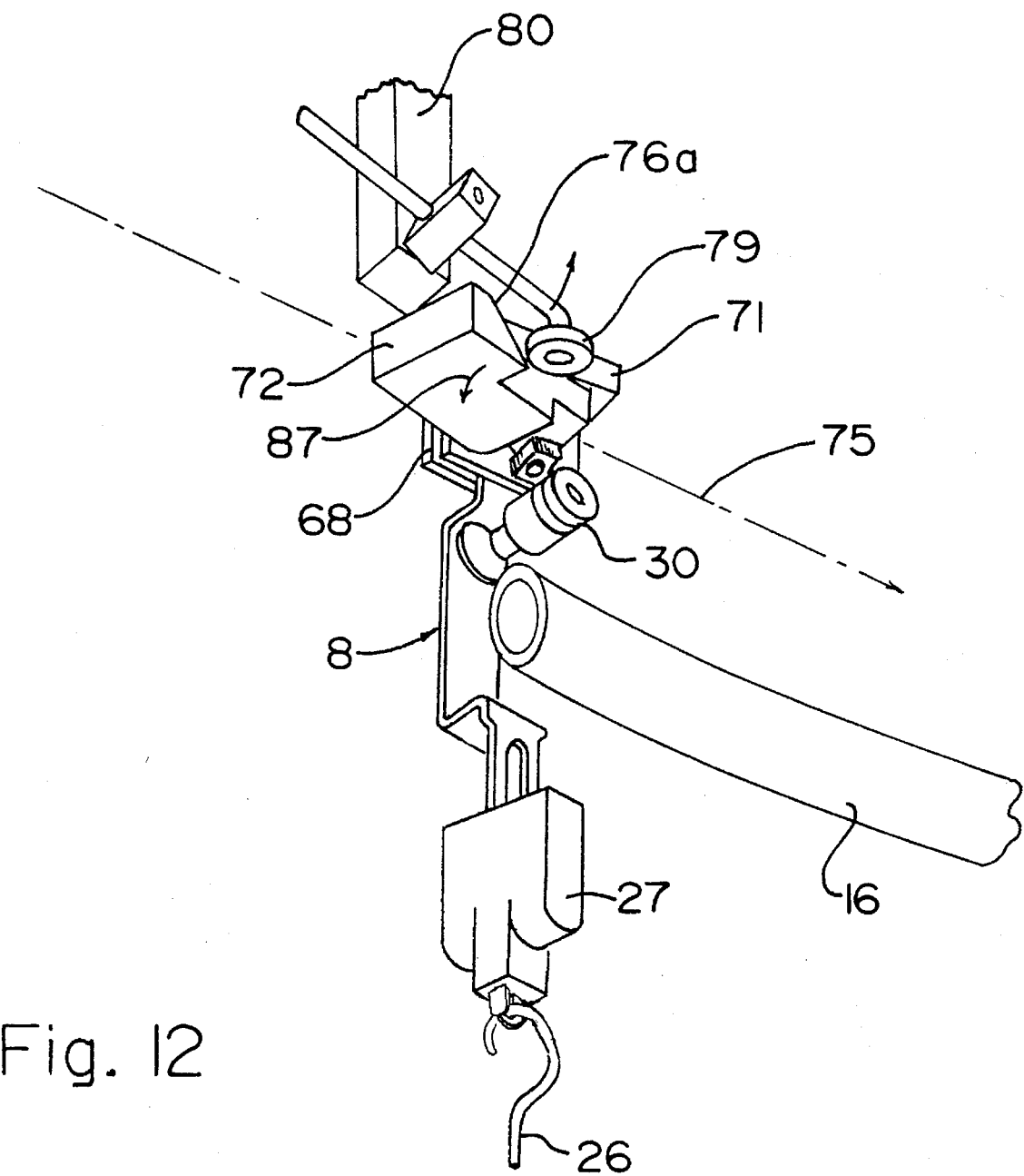
Figure 13:
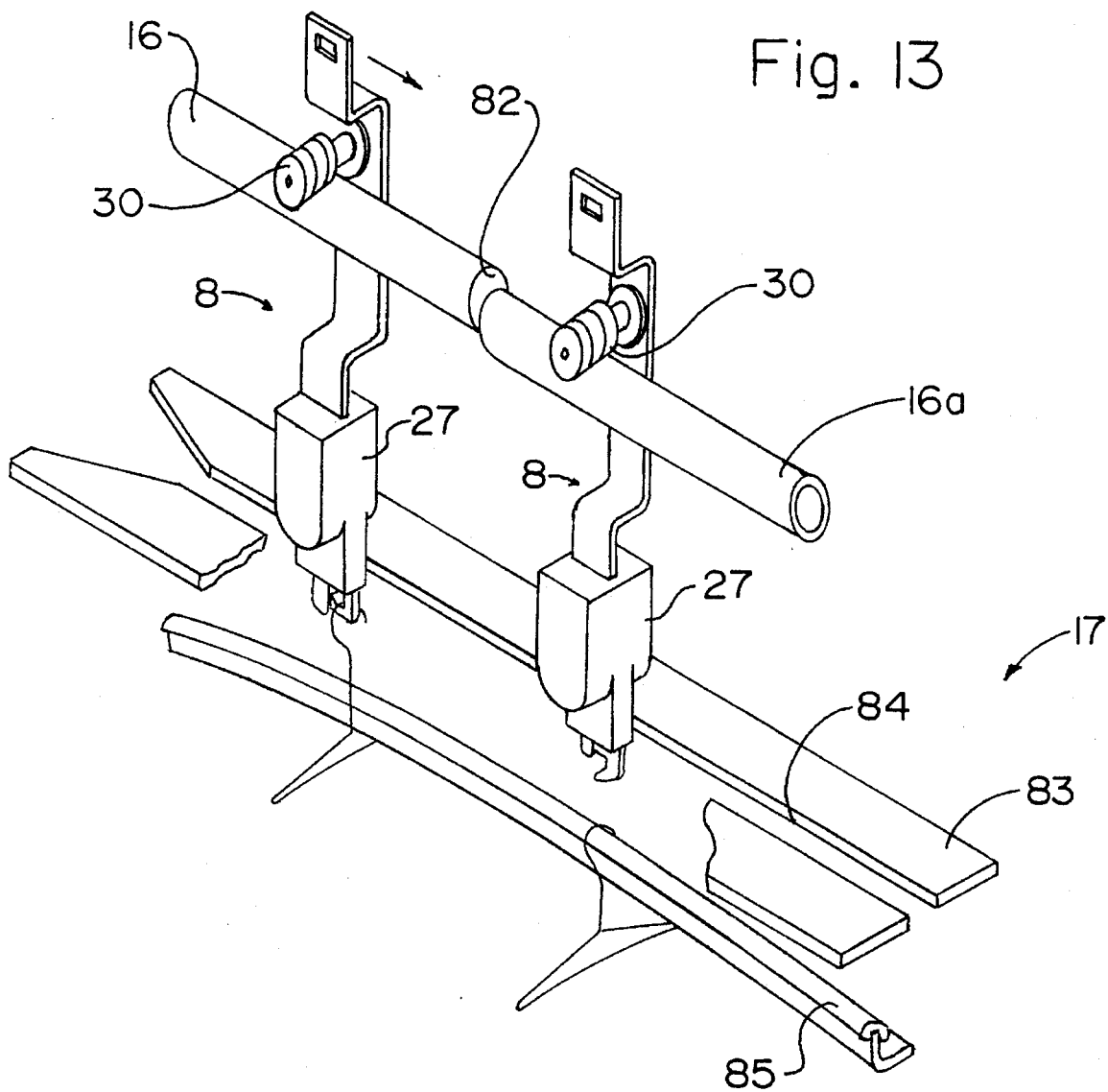

The following drawings will help to explain the invention in more detail. The drawings show the following:

FIG. 1 a frontal view of an intermediate hanger according to the invention;

FIG. 2 a side view of the intermediate hanger according to FIG. 1;

FIG. 3 a diagrammatic view of the sorter according to the invention in a perspective layout;

FIG. 4 a perspective view of the essential parts of the intermediate hanging station of the sorter;

FIG. 5 a perspective view of the coat hanger hook disentanglement system of the intermediate hanging station;

FIG. 6 a side view of the essential parts of the transport take-over station of the sorter;

FIG. 7 a frontal view of the transport take-over station;

FIG. 8 a side view of a conveyor cart with an intermediate hanger clamping device;

FIG. 9 a horizontal section through the conveyor cart according to FIG. 8 along the line IX—IX in FIG. 8 with the line of vision in direction of the arrow;

FIG. 10 another horizontal section through the conveyor cart according to FIG. 8 along the line X—X in FIG. 8 with line of vision in direction of the arrow;

FIG. 11 a side view of the discharge stretch of the sorter with discharge stations;

FIG. 12 a perspective view of the essential parts of a discharge station;

FIG. 13 a perspective view of the essential parts of the unhooking station.

The frame constructions of the sorter and the stations of the sorter are not represented in order to ensure the clarity of the drawings. The experts will be able to position the described essential operating parts of the stations in such fashion that they can operate as operating parts of the sorter in accordance with the invention.

In accordance with the invention, the sorter has a hanger take-over station 1 according to FIG. 3 with which garments 3 hanging on coat hangers 2 being transported on a trolley 4 in direction of the arrow 5 are automatically carried off with their hangers 2 to the pick-up bar 6 of an intermediate station 7. In the intermediate hanging station 7 the hangers 2 are picked-up by a intermediate hanger 8 which rolls hanging on a guide rail 9, and which is routed together with the hanger 2 and the garment 3 to an endless sorting transporting stretch 10, which can for instance be a simple sloping stretch. At the beginning of the transporting stretch 10 is a transport take-over station 11 in which each intermediate hanger 8 is picked-up by a conveyor cart 63, the conveyor cart 63 being attached in a fixed position and at a certain distance to an endless, driven conveyor chain 75. From the conveyor cart 63 the intermediate hangers 8 with hangers and garments are delivered to a discharge stretch 15 with several discharge stations 14, where intermediate hangers 8 with a specific garment including their hanger fall from the corresponding conveyor cart 63 onto an inclined sorting bar 16 and are rolled into an unhooking station 17, where each hanger 2 is automatically separated from the intermediate hanger 8. The sorted garments are removed from the sorter; the intermediate hangers 8 are collected and delivered back to the intermediate station 7.

Thanks to the use of intermediate hangers 8 running on rolls and conveyor carts 63 which can be operated relatively fast and which are arranged at specific, relatively short distances from each other, it was possible to create a simply built sorter which runs very fast and therefore can sort very quickly. The rolls of the intermediate hangers 8 self-propel themselves on inclined stretches which for expediency are provided between stations 1 and 7 as well as 7 and 11, and also 14 and 17, requiring only a relatively small inclination to transport themselves quickly. The conveyor carts 63 can be driven very quickly. The intermediate hanging of the intermediate hangers requires as little time as the hanging of the intermediate hangers on the conveyor carts. The unhooking system in the discharge station also operates very fast, allowing to create a sorter which generally operates much faster than all conventional sorters, although an additional operation sequence was added to the sorting cycle, namely the intermediate hanging of the intermediate hangers.

A suitable intermediate hanger 8 to accompany the hanger or article carrier 2 with the goods 3 during the transport and simultaneous sorting of the goods is illustrated in FIG. 1 and 2. It consists of a flat-bar steel strip rod 18, having above or on the top portion a vertically extending suspended bar 19 with a hanging eyelet 20, to which is connected a U-shaped angled bent 21, extending horizontally downwards from the side of the flat surface or strip surface. Underneath the angled bent is a vertically extending bearing bar 22, which on the bottom ends in a triangular recess 24 which is open in the back in transport direction (direction of the arrow 23 in FIG. 2). A curved stop flange 26 extending offset from the strip area is provided on the front edge 25 of the bearing bar 22 in the area of the recess 24. On the bearing bar rests a preferably square shaped weight 27 which glides free vertically, and which is shorter than the bearing bar 22 and therefore can be moved freely between the lower angular arm of the U 21a of the angled bent 21 and the stop flange 26. A cover plate 28, provided on the weight 27, overhangs the weight downwards and is arranged and positioned in such fashion that it covers and closes the recess 24 when the weight 27 is in the lowermost position.

A pivot 29 is provided just underneath the upper arm of the U 21b of the angled bent 21, standing horizontally and vertically on the base bar plane in the bottom arm of the U 21c and carrying a free rotating roller 30. The roller 30 has a special profile, similar to a sewing thread spool, having a radially reduced diameter or thinner part 31 with convex roll-off surfaces which rests on a complementary formed guide rail overlapped by the roll, on which it rolls off by force of gravity, the axial middle of the thinner part 31 being located in the flat strip plane 32 of the suspended bar 19 and the bearing bar 22.

On the end opposite the base bar of the U 21c, outside the thinner part 31, an annular tee-slot 33 is also provided which serves as a groove, the purpose of which is clarified below.

The function of the weight 27 is in first place to impart the intermediate hanger 8 sufficient weight in order to allow it to roll in a stable fashion and independently on an inclined stretch with a reduced slope, even without hangers or with hangers without garments. Secondly, the weight provides a sufficiently large surface to place codes. And thirdly, due to the force of gravity it provides sufficient closing force on the cover of the recess 24, so that hangers received in the recess 24 cannot slip out of the recess easily, although the recess 24 has a sloping edge 24a extending downwards and to the outside. Due to the sloping edge 24a, hangers could slide out of the recess 24 by themselves, if the weight 27 is lifted and the recess is opened. Similarly, the recess 24 is only able to receive hangers when the weight 27 is moved upwards.

Another advantage of the intermediate hanger 8 according to the invention is further that the leading code can be arranged on the base bar of the U 21c, which provides sufficient space for this purpose and which is easily identifiable and very accessible.

In order to connect the intermediate hangers 8 with the article carriers, for instance the coat hangers 2, the hangers 2 hanging on the trolleys 4 are removed from the trolley, for example, with a known hanger removal device 1 in accordance with U.S. Pat. No. 3 982 623, and then slide on an inclined and preferably rotating sliding bar 34 to the intermediate hanging station 7 (FIG. 4).

In a preferred version the intermediate hanging station 7 has a hanger separating system 35 in order to allow to deliver each hanger 2 in a controlled fashion and in sequence to an intermediate hanger 8. A hanger separating system is known for instance from the patent DE-GM 90 03 011, this system however has a complicated construction and operates very slowly. In addition, this known hanger separating system only works if the coat hangers are not accidentally entangled which, however, is very often the case. Thus, the special purpose of the present invention is to create a hanger separating device which has a simple construction, operates quickly and which also allows to safely separate hangers which got accidentally entangled. The hanger separating device 35 according to the invention, illustrated in FIG. 4 has below the sloping bar 34 which for instance rotates in the direction of the arrow 36, two guide rails 37, 38 arranged parallel to the bar 34, are placed in such fashion at a lateral distance from each other, that they form a narrow guiding slot 39 parallel to the axis of the bar 34 directly underneath the bar 34. The hanger throats 2a of the hanger hooks 2b slide in this slot 39, while the arms 2c of the hangers remain underneath the guide rails 37, 38 and the hanger hooks 2b rest on the bar 34. The guide rails 37, 38 end approximately where the bar 34 ends.

In addition, the hanger separating device 35 (FIG. 5) has at least two pointed, needle shaped separating fingers 41, 42 positioned at a certain distance from each other and in transport direction 40, which are arranged above the guide slot 39 transversally to the same and can be moved back and forth by means of not illustrated driving means. Preferably, a stop finger 43 is provided at a distance behind the separating finger 42 which can also be driven back and forth in the direction of the double arrow 44. The bar 34 is further provided with a flat wing shaped cutting knife bar 45 extending radially towards outside and positioned in transport direction 40 a short distance behind the separating finger 41 and whose flat plane extends vertically to the rotating axis of the bar 34.

The hanger separating system 35 in accordance with the invention, which can also be used for other hanger transporting installations in which hangers must be separated and/or it must be ensured that if necessary entangled hangers are separated, operates as follows:

The hanger 2 carrying for instance garments 3 slide downwards through force of gravity on the inclined bar 34 which rotates in the direction of the arrow 36, whereby the throat 2a of the first hanger 2 in a hanger row hits the separating finger 41 moving in the direction of the arrow 46, retaining the following hangers. The separating finger 42 is then pulled back in the direction of the arrow 47 and the stop finger 43 is pushed forwards. Then the finger 41 is withdrawn and the finger 42 is pushed forwards, causing the first hanger throat to bump against the separating finger 42. Then the separating finger 41 is pushed forwards again, sliding behind the hanger throat 2a of the hanger in the front. The distance between the separating fingers 41, 42 is kept so small that only one hanger throat 2a can fit in between. Shortly after the separating finger 42 is withdrawn (direction of arrow 47) and the cutting knife bar 45 is simultaneously turned into the gap 48 between the first hanger throat and the following hanger throats. If these hanger hooks are not entangled with each other, the first hanger in the row simply slides against the stop finger 43 which is pushed forward. If the hangers are entangled as illustrated in FIG. 5, the cutting knife bar 45 acts like a wedge driving between and separating the hanger hooks, thus allowing the first hanger in the row to glide by force of gravity unhindered to the stop finger 43.

This allows to create a very effective and fast operating hanger separating system with simple means, which also allows to safely separate entangled hangers.

In the intermediate station 7 (FIG. 4) according to the invention, the intermediate hangers 8 run hanging on an inclined delivery bar 49 located above the bar 34 by the force of gravity in the transport direction shown by the arrow 50, whereby its recess 24 faces in the opposite direction of the transport direction (arrow 50); they hit with the bottom of their annular tee-slot 33 approximately at the height of the axis of the roll 30 against the outer edge 52a of a vertically placed cam plate 52, rotating in transport direction (arrow 51) and which has cams 53 on its periphery which can engage in the annular tee-slot 33, lifting the intermediate hanger 8 from the delivery bar 49, delivering it to the curve of the outer edge 56 of a carrier plate 55 located a little below the disk plate 52 and inserted after the latter on the same vertical plane in transport direction and rotating in opposite direction (direction of arrow 57), whereby in addition a concave curved guiding edge 54 engages into the annular tee-slot 33 from above, preventing the roll 30 from jumping off the cam plate. The carrier plate 55 also has peripheral cams 58 which can engage in the annular tee-slot, whereby a concave curved guiding edge 59 also engages in the annular tee-slot 33 from below, allowing the roll 30 to roll-off the same. The guiding edge 54 and the outer edge 52a of the cam plate 52 as well as the guiding edge 59 and the outer edge 56 of the carrier plate 55 form an approximately sine curve shaped track for the roll 30 of an intermediate hanger 8. The means of transportation 52, 55 of the track are arranged in such fashion above the discharge end of the bar 34, that an intermediate hanger 8 with its open recess 24 is positioned before the end of an inclined slide 60 inserted after the discharge end of the bar 34, when a hanger slides on the slide 60 (FIG. 4). The pace of the stop finger 43 is such, that it always releases one hanger when the open recess 24 of an intermediate hanger 8 is in the discharge end of the slide 60.

Preferably, the slide 60 has a V-shaped cross section and consequently is formed with longitudinal groove, so that at least part of the recess 24 facing in the direction of the bar 34 can penetrate into the V-shaped groove of the slide 60, resulting in a smooth take-over of the hanger hook 2b, because the hanger hook glides on the upper edge of the groove 60, while part of the recess 24 is in the groove.

In order to position the recess 24, a V-shaped upsetting pocket 61 is provided below the carrier plate 55 into which the laterally projecting part of the weight 27 of the intermediate hanger 8 is introduced, until it hits the bottom of the pocket 61 and is stopped, whereby the intermediate hanger is forced another stretch down, thus freeing the recess 24 (FIG. 4). In this situation the roll 30 of the intermediate hanger 8 is situated by force in the lowest portion of the track 56/59, the lowest part of the pocket 61 being inserted slightly before this lowest part of the track in transport direction (arrow 50), so that the intermediate hanger 8 is positioned with a slight forward incline (see FIG. 4) when the hanger hook is taken over. As soon as a hanger hook 2b is in the recess 24, the roll 30 carried by a cam 58 crosses the lowest point in the track and is lifted together with the intermediate hanger, for the time being, however, still without weight. The weight 27 remains in the pocket 61 until it is carried by the stop flange 26 of the bearing bar 22, the covering plate 28 having closed the recess 24 first, so that the hanger hook 2b sits in the recess undetached.

The roll 30 is lifted and transferred from the track 56/59 on to a sloping slide bar 62, on which the intermediate hanger 8 can roll to the transport take-over station 11.

In the transport take-over station 11 (FIG. 6, 7) the intermediate hangers 8, on which the hangers 2 with the garments 3 are hanging, are hung on a transport block or a conveyor cart 63. For this purpose the station 11 is provided with a vertically extending cam plate 64, rotating in the direction of the arrow 65, whose rotation axis is located approximately at the height of the discharge end of the slide bar 62 and transversally to the same, and which is positioned in such manner, that the outer edge 66 of the cam plate 64 can engage in the groove 33 of a roll 30 which is kept in stand-by position at the discharge end of the slide bar 62, for example, by means of a finger (not illustrated). Cams 67 are provided on the periphery or outer edge 66 of the cam plate 64, which engage in the groove 33, carrying the roll 30 with its accessories upwards on an arched track.

A conveyor cart 63 is present each time a roll 30 arrives at the zenith of the arched track, the conveyor cart having a support prong 68 open towards the bottom, between the arms of which the suspended bar 19 is lifted by a cam 67. One of the prong arms has a hole through which a pin 69 is inserted, whose front end bumps against the inner wall of the other prong arm or plunges in that place into a depression or hole. On the other end, the pin 69 is provided with a pivoting bearing 70 (FIG. 10) on the front end of a spring-loaded rocking lever 72 which sits on a bearing plate 71 with a pivoting bearing 73 placed on the support prong 68.

The carts 63 are attached at certain distance from each other to an endless, driven chain belt 75 on the transport stretch 10, the chain being preferably a stud chain—as illustrated in FIG. 8—, driven with vertically extending chain links, whereby the conveyer carts 63 hang underneath the chain 75. In order to drive the chain 75 and the conveyer carts 63, rollers 74 attached to the chain with their axes transversally to the longitudinal extension of the chain are provided at determined intervals above a transport block 63 and above the chain, rolling off on a rectangular tube rail 76.

In order to hang an intermediate hanger 8, a cart 63, having a take-up slope 76a on the rocking lever 72 drives past a take-up reel 77 firmly installed in station 11 which swivels the lever 72 so that the pin 69 slips out of the gap in the prong 68. Then the suspended bar 19 of an intermediate hanger 8 is lifted into this gap, until the eyelet 20 is in the contact zone of the pin 69; then the roll 77 leaves the guide track and the take-up slope 76, so that the lever 72, due to the effect of the spring 78 which supports itself on the prong 68 and engages with the lever 72, swivels back and the pin 69 penetrates the eyelet 20. The intermediate hanger 8 with its accessories now hangs on the conveyer cart 63. The continuous operation of the chain 75 allows the hanging. The lifting movement of the cam plate 64 located in the machine frame 12a and carried out by the drive 12 is synchronized in such fashion with the transportation route of a cart 63, that the take-over can be carried out through a continuous movement.

The firmly installed discharge stations 14 inserted after the hanging stations 11 in the area of the discharge stretch 15, for instance have sprocket wheels or rolls 79 attached to the tube rail 76, which can be swivelled into the take-up slope 76a of a cart 63 by means of a switching mechanism 80 (FIG. 12). Underneath a roll 79 is located the beginning of a sloping sorting bar 16. When the roll 79 runs on a take-up slope 76a, the lever 72 is swivelled in the direction of the arrow 81 and the pin 69 is pulled out of the eyelet 20. Then the roll 30 with accessories falls onto the inclined sorting bar 16, rolling by the force of gravity towards the unhooking station 17.

The unhooking station 17, illustrated in perspective view and in principle in FIG. 13, has a step 82 in the sorting bar 16 on which the intermediate hangers 8 arrive rolling. In the area below the step 82 is an upsetting rail 83 with a vertical guiding slot 84 located underneath the sorting bar 16, in particular in the area below the step 82, whereby the portion of the bearing bar 22 located underneath the weight 27 slides through the guiding slot. The distance between the rail 83 and the sorting bar 16 has been selected in such fashion, that the intermediate hanger 8 with its bearing bar 22 can slide freely into the slot 84 before the step. However, if the roll 30 falls down the step 82, the sides of the weight 27 strike the rails 83, causing the bearing bar 22 to slide further through the slot 84, until the roll 30 reaches the graded area 16a of the sorting bar 16. This causes the opening of the recess 24 due to the upset of the weight 27, and the hanger hook 2b can slide out of the recess 24 on the downward sloping edge 24a by force of gravity, falling on to a delivery bar 85 placed under the rail 83, where it is stowed together with its accessories ready for automatic delivery if necessary. The intermediate hangers 8 which accumulate on the bar 16a are delivered back automatically, for instance by means of sloping bars, to the intermediate station 7.

I claim:

1. Method for automatic sorting of articles transported in file hanging on hangers and provided with codes, in particular garments hanging on coat hangers, comprising the steps of:

hanging a hanger on an intermediate hanger;

lifting and hanging the intermediate hanger on a carrier attached to an endless chain belt;

continuously driving the endless chain belt;

guiding the carrier with the intermediate hanger hooked thereon through a delivery stretch provided with several delivery stations; and discharging the hanger in a programmed manner based upon a code associated therewith, including:

unhooking the intermediate hanger from the carrier in a pre-determined one of the delivery stations so that the intermediate hanger falls onto an inclined sorting bar; and permitting the intermediate hanger to roll, by force of gravity, along the sorting bar in a rolling engagement provided by a roll on the intermediate hanger engaging with the sorting bar.

2. Method according to claim 1, characterized in that each intermediate hanger including an article is hung automatically on the carrier, and is automatically unhooked by the carrier in the pre-determined delivery station, rolling with the hanger and the article on the sorting bar to a removal station.

3. Method according to claim 2 characterized in that the hangers including the articles are automatically separated from the intermediate hanger in a corresponding unhooking station, whereby the hangers with the articles as well as the intermediate hangers are each timely picked-up by one collecting bar.

4. Method according to claim 1 characterized in that each intermediate hanger is provided with a code.

5. Equipment for automatic sorting of articles (3) transported on a row of hangers (2), in particular garments hanging on coat hangers, comprising:

a hanger take-over mechanism (1) for transporting the hangers (2) to an intermediate station (7) for hanging the hangers (2) on intermediate hangers (8);

a sorting conveyor stretch (10) extending away from the intermediate station (7), the sorting conveyor stretch (10) including an endless continuously driven chain (75) provided with conveyor carriers (63);

a transport take-over station (11) being disposed at a beginning of the sorting conveyor stretch (10), the transport take-over station (11) including means for the conveyor carriers (63) to pick up the intermediate hangers (8) so that one conveyor carrier (63) carries one intermediate hanger (8);

a discharge stretch (15) provided with several discharge stations (14) is disposed along the sorting conveyor stretch (10), inclined sorting bars (16) are arranged with one sorting bar (16) being disposed underneath each discharge station (14) so that the intermediate hangers (8) fall, one at a time, from the conveyor carriers (63) onto an associated one of the sorting bars (16) and roll along the associated sorting bar (16) in a rolling engagement provided by a roll (30) on each of the intermediate hangers (8) engaging with the associated sorting bar (16).

6. Equipment according to claim 5, characterized in that the hanger (2) is placed on a lower end of the intermediate hanger (8) and the roll (30) is disposed in an area of an upper end of the intermediate hanger (8).

7. Equipment according to claim 5, characterized in that each intermediate hanger (8) is provided with a code.

8. Equipment according to claim 7, characterize in that the intermediate hanger (8) essentially consists of a flat-bar steel strip rod (18), having on its head end a vertically extending suspended bar (19) with a hanging eyelet (20) to which is connected in downward direction a U-shaped angled bent (21) extending laterally in a curve from the strip plane, underneath which is a vertically extending bearing bar (22) which at a bottom is provided with a hanger receiver open towards a back in transport direction which has a shape of a recess (24) and is equipped with means for closing.

9. Equipment according to claim 8, characterized in that a right angled stop flange (26) extending offset from the strip plane is located on a front edge (25) of the bearing bar (22), approximately at a height of the recess (24).

10. Equipment according to claim 9, characterized in that a weight (27) sliding freely in vertical direction rests on the bearing bar, said weight being shorter than a distance between the stop flange (26) and a lower angular arm (21a) of the angled bent (21), and which consequently slides freely between the lower angular arm of the U (21a) of the angular bent (21) and the stop flange (26).

11. Equipment according to claim 10, characterized in that a cover plate (28) is provided on the weight (27), which overhangs the weight in part downwards and which is arranged and positioned so that it covers and closes the recess (24), when the weight (27) is in a lowermost position.

12. Equipment according to claim 8, characterized in that at a short distance under an upper arm (21b) of the angled bent (21), a swivel axis (29) is provided in a bottom arm (21c) of the angled bent (21) which is attached standing horizontally and vertically on a bottom bar plane and which carries the roll (30).

13. Equipment according to claim 12, characterized in that the roll (30) essentially has a shape of a sewing thread spool, having a radial thinner part (31) with a convex roll-off surface which rests on a complementary guide rail or guide bar (62, 16) which overlaps the roll, whereby an axial middle of the thinner part (31) is located in a flat strip area (32) of the suspended bar (19) and of the bearing bar (22).

14. Equipment according to claim 13, characterized in that outside that thinner part (31), in an area of the roll (30) opposite the bottom arm (21c), an annular tee-slot 33 is provided.

15. Equipment according to claim 10, characterized in that the weight (27) is provided with a code.

16. Equipment according to claim 12, characterized in that the bottom arm (21c) is provided with a code.

17. Equipment according to claim 5, characterized in that the hanger take-over mechanism (1) is located on an inlet side of the sorting conveyor stretch (10) which has a rotating guide bar (34) integrated in the intermediate hanging station (7) and which serves for the hanging of the intermediate hangers (8).

18. Equipment according to claim 17, characterized in that it has a hanger separating mechanism (35) for a controlled forwarding of individual hangers to a take-over mechanism which positions the intermediate hanger (8).

19. Equipment according to claim 17, characterized in that an inclined delivery bar (49) is located above the bar (34), on which the hanging intermediate hangers (8) roll into the intermediate station (7) by force of gravity, a recess (24) in each of the intermediate hangers (8) facing in an opposite direction of a transport direction (50), and that at an end of the delivery bar (49), approximately at a height of a roll axis of the intermediate hanger (8), opposite an annular tee-slot (33) is located an outer edge (52a) of a vertically installed cam plate (52) rotating in transport direction which has cams (53) on a periphery to engage in the annular tee-slot (33), and where a carrier plate (55) is provided slightly underneath the cam plate (52) which is located in a same vertical plane and rotates in opposite direction, and in addition a concave curved guiding edge (54) of a guiding plate engages in the annular tee-slot from above and outside, the carrier plate (55) also has cams on a periphery (58) which engage in the annular tee-slot (33), and a concave curved guiding edge (59) extending from underneath and outside is also provided to engage in the annular tee-slot, so that the guiding edge (54) and the outer edge (52a) of the cam plate (52) as well as the guiding edge (59) and an outer edge (56) of the carrier plate (55) form an approximately sine curve shaped guideway for the roll (30) of the intermediate hanger (8), and that conveying means (52,55) of the guide rail are arranged above a discharge end of the bar (34), so that the intermediate hanger (8) with its recess (24) open is positioned before an end of a sloping slide (60) positioned after the discharge end of the bar (34) when the hanger (2) slides on the slide (60).

20. Equipment according to claim 19, characterized in that the slide (60) has grooves and at least part of the recess (24) of an intermediate hanger (8) facing in direction of the bar (34) can penetrate into a V-shaped groove of the slide (60) when a hook of hanger (2) slides on an upper edge of the groove.

21. Equipment according to claim 19, characterized in that a V-shaped upsetting pocket (61) is provided underneath the carrier plate (55) for positioning the recess (24), into which a laterally protruding area of a weight (27) of the intermediate hanger (8) is introduced until it hits a bottom of the pocket (61) and is stopped, whereby the intermediate hanger is forced slightly further down and the recess (24) is freed, until the roll (30) of the intermediate hanger (8) is forced into and rests in a lowest point of a guide track (56/59) defined by the guiding edge (59) and the outer edge (56) of the carrier plate (55), a lowest point of the pocket (61) being positioned shortly before the lowest point of the guide track (56/59) in the transport direction (50).

22. Equipment according to claim 21, characterized in that an inclined slide bar (62) is positioned after the guide track (56/59), on which the intermediate hangers roll to the transport take-over station (11).

23. Equipment according to claim 22, characterized in that the transport take-over station (11) is provided with a vertically extending cam plate (64) positioned after the slide bar (62), whose rotating axis is located approximately at a height of a discharge end of the slide bar (62) and transversally to the same, the cam plate (64) is positioned so that its outer edge (66) with cams (67) engage in the annular tee-slot (33) of the roll (30), so that the intermediate hanger (8) is lifted onto an arched track.

24. Equipment according to claim 23, characterized in that each case one conveyor carrier (63) is located in a zenith of the arched track when one roll (30) arrives.

25. Equipment according to claim 24, characterized in that the conveyor carrier (63) is provided with a support prong (68) open towards a bottom part, a suspended bar (19) of the intermediate hanger (8) is lifted between arms of the support prong (68) by one of the cams (67), one prong arm has a hole through which a pin (69) is inserted, a front end of the pin (69) strikes against an inner wall of the other prong arm or plunges into a depression or a hole in the other prong arm, the pin has on its other end a pivoting bearing (70) placed on a front end of a spring loaded rocking lever (72) which rests with a pivoting bearing (73) on a bearing plate (71) which is attached to the support prong (68), the conveyor carrier is attached to the endless continuously driven chain (75) at a certain distance to other conveyor carriers along the sorting conveyor stretch (10).

26. Equipment according to claim 25, characterized in that the chain (75) is a stud chain, guided with vertically extending chain links, the conveyor carriers (63) hang under the chain (75), and in order to guide the chain (75) and the conveyor carriers (63) rolls (74) attached to the chain above the same are provided at a certain distance above each conveyor carriers (63), the rolls (74) having axes extending transversally to a longitudinal extension of the chain and rolling in hanging position on a rectangular tube rail (76).

27. Equipment according to claim 24, characterized in that each conveyor carrier (63) has a take-up slope (76a) located on a rocking lever (72) which operates together with a firmly installed take-up reel (77) in the transport take-over station (11).

28. Equipment according to claim 5, characterized in that the discharge stations (14) in an area of the delivery stretch (15) are provided with sprocket wheels (79) attached to a tubular rail (76) which can be swivelled into a path of a take-up slope (76a) of a conveyor carrier (63) by means of a switching mechanism (80).

29. Equipment according to claim 28, characterized in that a beginning of the inclined sorting bar (16) is located underneath an associated one of the sprocket wheels (79).

30. Equipment according claim 5, characterized in that an unhooking station (17) is provided for removing the intermediate hanger (8).

31. Equipment according to claim 30, characterized in that the unhooking station (17) has a step (82) in the sorting bar (16), a guiding slot (84) is located vertically under the sorting bar (16) and parallel to the same, through which a portion of a bearing bar (22) of the intermediate hanger (8), located under a weight (27) disposed on the intermediate hanger (8), can slide, and that a distance between the guiding slot (84) and the sorting bar (16) is chosen so that the intermediate hanger (8) with its bearing bar (22) can slide freely in the slot (84) before the step (82) with the weight (27) being positioned above the slot, where the weight strikes against a side wall of the slot (84) when the roll (30) falls down the step (82).

32. Hanger separating mechanism, comprising:

a rotating, inclined bar (34) extending longitudinally in a transport direction (40) for supporting hooks (2b) of hangers (2);

two guide rails (37, 38) disposed underneath and parallel to the bar (34), the two guide rails (37, 38) being positioned at a lateral distance from each other to provide a narrow guide slot (39) having a longitudinal axis directly under and parallel to a rotating longitudinal axis of the bar (34) so that throats (2a) of the hangers (2) can slide freely in the slot (39) in a guided arrangement with arms (2c) of the hangers (2) being disposed underneath the guide rails (37, 38), free ends of the guide rails (37, 38) being disposed approximately at a free end of the bar (34);

two pointed, needle shaped separating fingers (41, 42) being driven transversely back and forth for engaging the throats (2a) of the hangers (2), the separating fingers (41, 42) being disposed between the bar (34) and the guide rails (37, 38) so that the separating fingers (41, 42) are arranged transversely to and a short distance above the guide slot (39), the separating fingers (41, 42) being positioned at a pre-determined distance from each other; and the bar (34) being provided with a cutting knife bar (45) having a flat wing shape so that a flat plane of the cutting knife bar (45) is vertical to the rotating longitudinal axis of the bar (34) for engaging between the hooks (2b) of the hangers (2), said cutting knife bar (45) extending radially outwardly from the bar (34) and being positioned shortly before a first finger (41) of the separating fingers (41, 42) relative to the transport direction (40).

33. Hanger separating mechanism according to claim 32, characterized in that a stop finger (43) is positioned parallel to and at a distance after a second finger (42) of the separating fingers (41, 42) relative to the transport direction (40), the stop finger (43) is driven transversely back and forth for engaging the throats (2a) of the hangers (2).

* * * * *